United States Patent [19]
Kellogg

[11] Patent Number: 5,896,206
[45] Date of Patent: Apr. 20, 1999

[54] COMBINATION PRINTER AND SCANNER HAVING SINGLE PAPER PATH WITH PINCH ROLLERS ACTUATED BY PEN DOOR

[75] Inventor: William H. Kellogg, Encinitas, Calif.

[73] Assignee: Hewlett-Packard Company, Palo Alto, Calif.

[21] Appl. No.: 08/712,109

[22] Filed: Sep. 13, 1996

[51] Int. Cl.$^6$ ............................. B41J 11/58; H04N 1/04
[52] U.S. Cl. .................... 358/498; 358/494; 358/496; 400/624; 400/629
[58] Field of Search ............................ 358/498, 496, 358/400, 474, 473, 472, 494; 271/9.09, 9.13, 273, 274; 400/624, 625, 629

[56] References Cited

U.S. PATENT DOCUMENTS

| | | | |
|---|---|---|---|
| 5,077,614 | 12/1991 | Stemmle et al. | 358/472 |
| 5,105,279 | 4/1992 | Kamada et al. | 358/472 |
| 5,391,099 | 2/1995 | Stodder . | |
| 5,539,538 | 7/1996 | Terao | 358/472 |
| 5,570,205 | 10/1996 | Sugita et al. | 358/472 |
| 5,833,381 | 11/1998 | Kellogg et al. | 358/498 |

*Primary Examiner*—Edward L. Coles
*Assistant Examiner*—Mark E. Wallerson
*Attorney, Agent, or Firm*—Jerry R. Potts

[57] ABSTRACT

A combination printer and scanner comprises a frame and a plurality of rollers mounted in the frame that define a single paper path through the frame. The combination printer and scanner further comprises an automatic sheet feeder and an automatic document feeder mounted to the frame for selectively providing clean paper print sheets and documents having text and/or graphics to be scanned, respectively, to the single paper path. A scanner station is mounted in the frame for scanning documents conveyed through the single paper path. A printer station is mounted in the frame for printing text and/or graphics on print sheets conveyed through the single paper path. A pen door is hingedly connected to the frame for opening and closing a region along the single paper path to allow access to the scanner station to permit the cleaning of a scanner window thereof. Clamping mechanisms are also provided so that the opening and closing of the pen door releases and applies tension on at least one set of rollers defining the single paper path to permit a print sheet or document jammed therebetween to be removed.

15 Claims, 8 Drawing Sheets

COMBINATION PRINTER AND SCANNER HAVING SINGLE PAPER PATH WITH PINCH ROLLERS ACTUATED BY PEN DOOR

CROSS-REFERENCE TO RELATED APPLICATION

This application is related to U.S. patent application Ser. No. 08585,058, filed Jan. 8, 1996 and entitled MULTIPLE-FUNCTION PRINTER WITH COMMON FEEDER/OUTPUT PATH MECHANISMS AND METHOD OF OPERATION. Said application names Samuel A. Stodder and Steven O. Stocker as co-inventors and is assigned to Hewlett-Packard Company, the assignee of the subject application. The entire disclosure of said application is hereby incorporated by reference.

BACKGROUND OF THE INVENTION

The present invention relates to computer printers and facsimile machines, and more particularly, to mechanisms for enabling a user to clear a paper jam or clean a scanner window in such devices.

In computer printers and facsimile machines, it is very important to be able to remove a sheet of paper jammed somewhere in the paper path. In facsimile machines, it is also important to be able to clean the scanner window in order to insure that a high quality image of the document being scanned can be reproduced at the receiving facsimile machine. Over the past several years, combination printer and scanner devices have become popular. These devices may be connected to a conventional personal computer for printing high quality text and graphics on plain paper utilizing an ink jet printer cartridge. They also incorporate optical scanning elements and a modem for permitting documents having text and/or graphics printed thereon to be sent to remote location via facsimile over standard telephone lines. In some instances, a combined printer and scanner can actually scan a document, and then print an image thereof on a sheet of paper, thereby operating as an inexpensive copier. An example of a combination printer and scanner having the foregoing capabilities is the OfficeJet (trademark) desktop unit manufactured by Hewlett-Packard Company, the assignee of the present application.

Heretofore combination printer and scanner devices have incorporated two separate paper paths. One of these paths is utilized for feeding clean paper print sheets to a printer station. The other paper path is utilized to feed documents to be scanned to a scanner station. Access to the print sheet path is independent of access to the document scanning path. The clearing of paper jams or the cleaning of the scanner window in such prior art devices is cumbersome and complex. The user must know how to access each of the separate paths and how to release the pinch rollers therein.

In U.S. Pat. No. 5,391,009 of Stodder, assigned to Hewlett-Packard Company, there is disclosed an improved combination printer and scanner having a single common paper path. However, the construction of this device does not allow for simple and rapid clearing of paper jams or cleaning of the scanner window.

SUMMARY OF THE INVENTION

It is therefore the primary object of the present invention to provide an improved combination printer and scanner.

It is another object of the present invention to provide an improved combination printer and scanner having a single paper path.

It is another object of the present invention to provide an improved combination printer and scanner constructed to facilitate easier and quicker clearing of paper jams and cleaning of the scanner window.

According to the present invention a combination printer and scanner comprises a frame and a plurality of rollers mounted in the frame that define a single paper path through the frame. The combination printer and scanner further comprises an automatic sheet feeder and an automatic document feeder mounted to the frame for selectively providing clean paper print sheets and documents having text and/or graphics to be scanned, respectively, to the single paper path. A scanner station is mounted in the frame for scanning documents conveyed through the single paper path. A printer station is mounted in the frame for printing text and/or graphics on print sheets conveyed through the single paper path. A pen door is hingedly connected to the frame for opening and closing a region along the single paper path to allow access to the scanner station to permit the cleaning of a scanner window thereof. Clamping mechanisms are also provided so that the opening and closing of the pen door releases and applies tension on at least one set of rollers defining the single paper path to permit a print sheet or document jammed therebetween to be removed.

DETAILED DESCRIPTION OF THE PREFERRED EMBODIMENT

The entire disclosure of U.S. Pat. No. 5,391,009 is hereby incorporated by reference. Said U.S. Pat. No. 5,391,009 was granted on Feb. 21, 1995 to Samuel A. Stodder and is entitled SINGLE MOTOR ACTUATION FOR AUTOMATIC STACK FEEDER SYSTEM IN A HARDCOPY DEVICE. Said U.S. Pat. No. 5,391,009 is assigned to Hewlett-Packard Company, the assignee of the subject application.

Referring to FIGS. 1, 2A, 2B and 3, the illustrated embodiment 10 of the combination printer and scanner of the present invention includes a forward printer chassis 12 and a rearward media chassis 14 that is connected to, and supported by, the printer chassis 12. The printer chassis 12 and media chassis 14 sit on a base 15 (FIG. 3) and together these parts provide a frame for mounting and supporting the components hereinafter described on a desktop. A stack of clean paper print sheets is loadable into an automatic sheet feeder (ASF) 16 (FIGS. 1, 2A and 3) connected to the media chassis 14. A stack of documents having text and/or graphics to be scanned is loadable into an automatic document feeder (ADF) 18 (FIGS. 1, 2A and 3) also connected to the media chassis 14. Individual print sheets can be picked off from the stack in the ASF 16 and drawn into a common paper path by an ASF pick roller 20. Alternatively, individual documents to be scanned can be picked off the stack in the ADF 18 and drawn into the same common paper path by an ADF pick roller 22. The print sheets travel from the ASF 16 along the path labeled P in FIG. 1. The documents to be scanned travel from the ADF 18 along the path labeled D in FIG. 1. The paths P and D merge into a common single paper path, the first segment of which is labeled S1 in FIG. 1. The print sheets or documents are grabbed between a plurality of pre-scan pinch rollers 24 and 26 (FIGS. 1, 2A and 3) which draw these pages through a scanner station 27 (FIG. 2A) along the segment of the paper path labeled S1 in FIG. 1. The basic optical components of the scanner station 27 are illustrated schematically in FIG. 2B. The scanner station 27 includes a transversely extending transparent scanner window 28, mirrors 29a, 29b and 29c, an illumination source 30, a lens assembly 31 and a photodetector 32. When the combination printer and scanner 10 is operating in its scan mode, a document having text and/or graphics printed on the underside thereof will have this information illuminated through the scanner window 28 by the source 30. An image of the text and/or graphics is reflected by the mirrors 29a, 29b and 29c and is focused by the lens assembly 31 onto the photodetector 32. The photodetector 32 may comprise a plurality of charge coupled devices. Signals from the photodetector 32 are amplified, digitized, and then conveyed through a control system 33 (FIG. 2A) to a conventional digital modem 34 for transmission over standard telephone lines.

Figure 1:
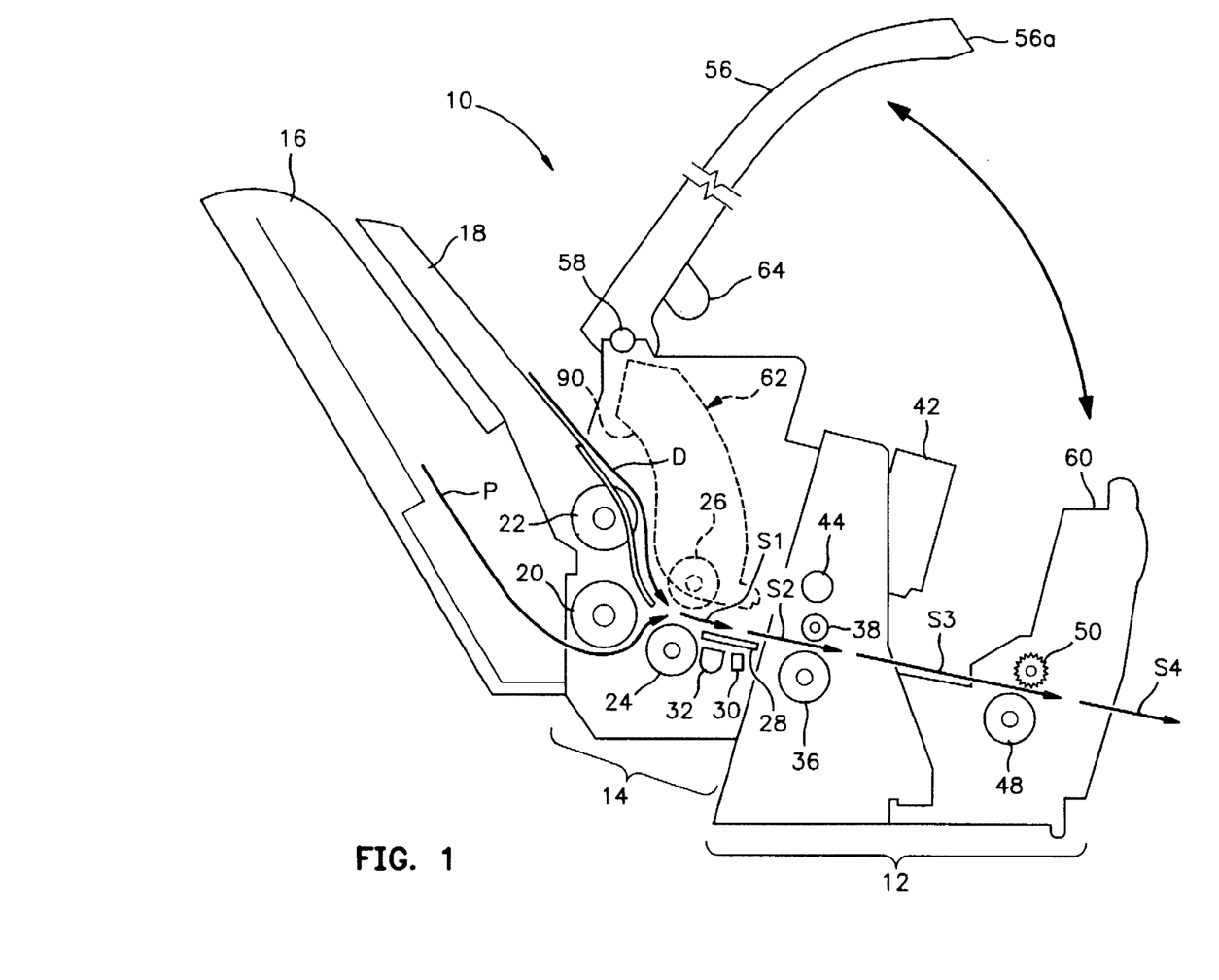
FIG. 1 is a diagrammatic side view of a combination printer and scanner embodying a preferred embodiment of the present invention.
Figure 2A:
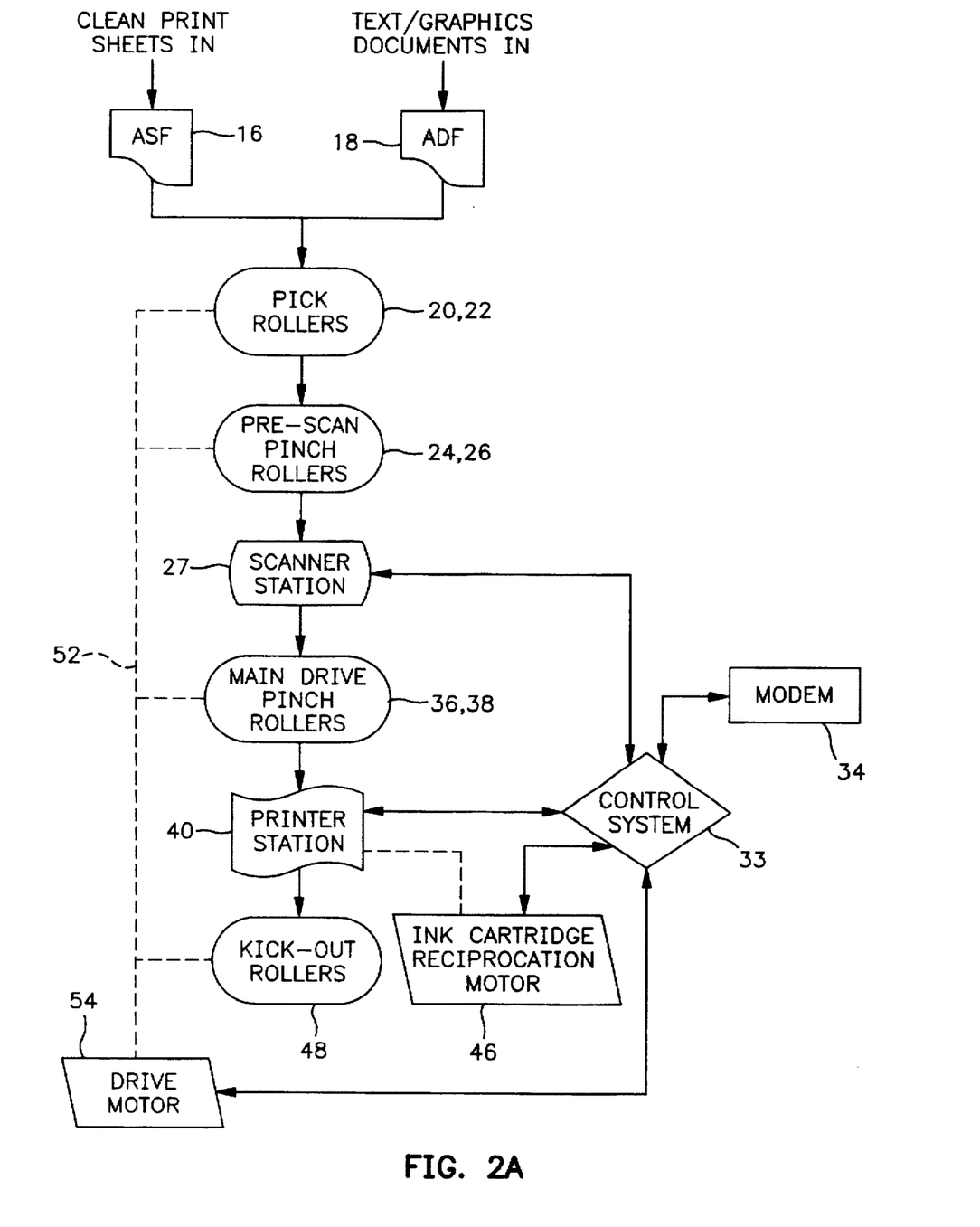
FIG. 2A is a functional block diagram of the preferred embodiment of FIG. 1.
Figure 2B:
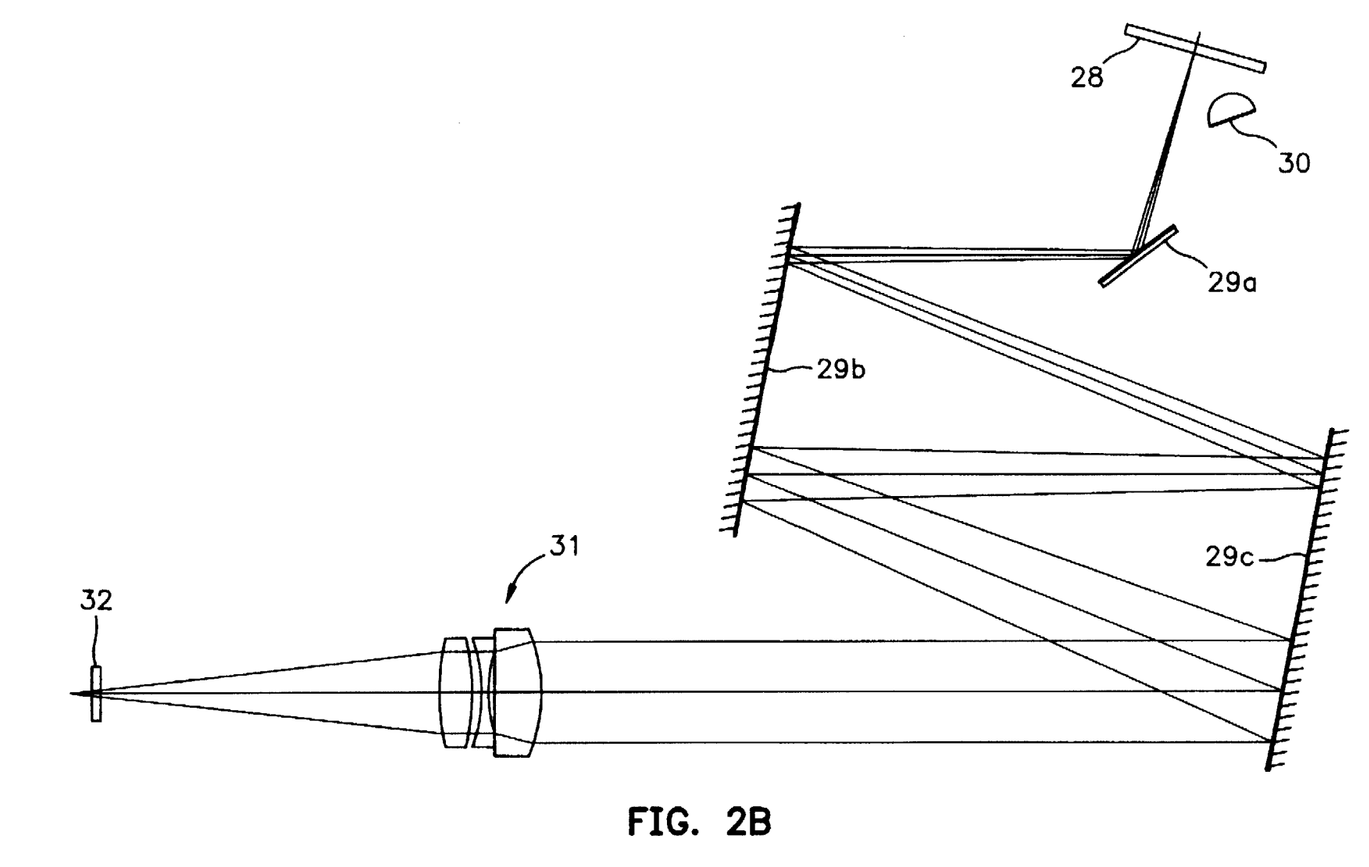
FIG. 2B is a schematic illustration of the optics in the scanner station of the preferred embodiment of FIG. 1.
Figure 3:
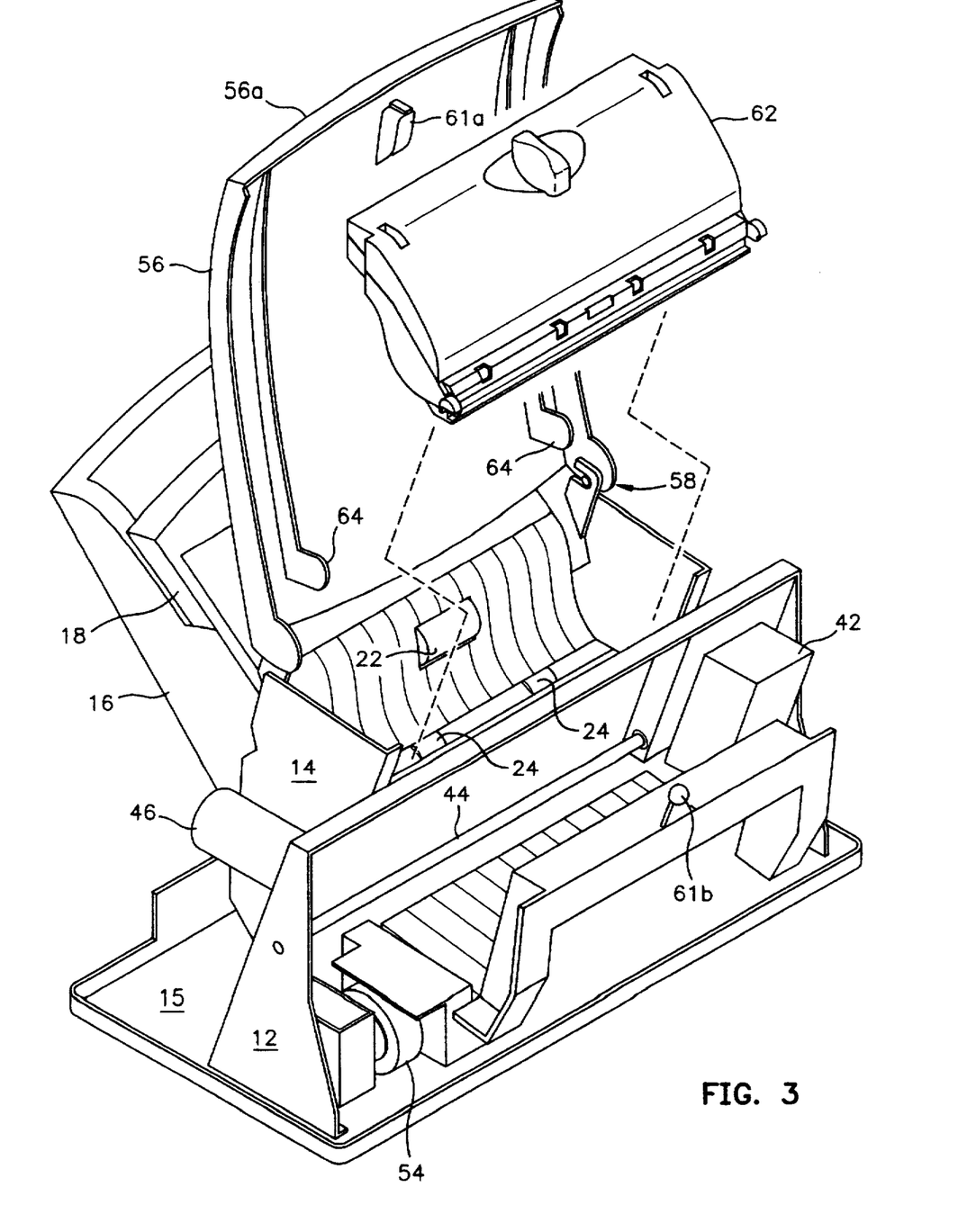
FIG. 3 is a simplified isometric view of the preferred embodiment showing its pen door open and its ADF cartridge removed.

Print sheets or documents which pass over the scanner window 28 are pulled along the segment of the paper path labeled S2 in FIG. 1 by a pair of main drive pinch rollers 36 and 38 through a printer station 40 (FIG. 2A). The printer station 40 incudes an ink jet print cartridge 42 (FIGS. 1 and 3) mounted for reciprocal motion on a transverse rod 44. When the combination printer and scanner 10 is operating in its print mode, text and/or graphics are printed on the upper side of a clean print sheet from the ASF 16 by the ink jet print cartridge 42 as the print sheet passes along the segment of the paper path labeled S3 in FIG. 1. The print cartridge 42 has an active lower face through which tiny droplets of ink are expelled in conventional fashion when the cartridge is driven by the appropriate signals from a print drive circuit in the control system 33. The height of the print cartridge 42 above the paper path S3 is exaggerated in FIG. 1. The print cartridge 42 is reciprocated back and forth along the rod 44 by an ink cartridge reciprocation motor 46 (FIGS. 2A and 3). The motor 46 is driven by a motor drive circuit in the control system 33 (FIG. 2A).

The print sheets or documents are next pulled through the printer chassis 12 by kick-out rollers 48 (FIG. 1) which cooperate with an adjacent plurality of toothed star rollers 50. The printed sheets or scanned documents exit the printer chassis 12 along the segment of the paper path labeled S4 in FIG. 1. The pick, pinch, drive and kick-out rollers are connected through a gear drive train 52 (FIG. 2A) to a single drive motor 54 (FIGS. 2A and 3). The drive motor 54 is preferably a stepper motor. It is driven by a stepper motor drive circuit in the control system 33 (FIG. 2A). The stepper motor drive circuit facilitates precision coordinated driving of clean print sheets or documents to be scanned from the ASF 16 and the ADF 18, respectively, through the media chassis 14 and through the printer chassis 12.

A pen door 56 (FIGS. 1 and 3) is hingedly connected to the upper part of the media chassis 14 by a hinge assembly 58. This permits the pen door 56 to rotate between its open position illustrated in FIG. 3 to its closed position illustrated in FIG. 7. In its closed position the remote outer end 56a of the pen door 56 seats in a receptacle 60 (FIG. 1) formed in an upper forward part of the printer chassis 12. A latch assembly including a latch member 61a (FIG. 3) on the underside of the pen door 56 holds the pen door 56 in its closed position. The latch member 61a snaps over a latch element 61b connected to the printer chassis 12. The pivoting motion of the pen door 56 is shown by the double ended arrow in FIG. 1. When in its closed position, the pen door 56 conceals the rollers, drive train, motors, print cartridge and so forth located inside the media chassis 14 and the printer chassis 12.

A manually removable ADF cartridge 62 is illustrated in phantom lines in FIG. 1 and solid lines in FIG. 3. The ADF cartridge 62 is normally seated within the upper part of the media chassis 14. The ADF cartridge 62 incorporates the pinch rollers 26. An operator may lift the pen door 56 to its open position illustrated in FIG. 1, remove the ADF cartridge 62 and fix a paper jam or clean the scanner window 28. It is important to be able to clean the scanner window 28, since any debris thereon will cause vertical streaks to appear in the facsimile reproduction of the document sent by the modem 34 when printed at the remote receiving station. As will be explained in greater detail hereafter, the inner end of the pen door 56 has a pair of actuators 64 (FIGS. 1 and 3) projecting downwardly from the underside thereof which engage the ADF cartridge 62 when the pen door is closed. Through this process, the ADF cartridge 62 is clamped in its appropriate location against datum surfaces hereafter described. This ensures that the correct paper path is formed between the pick roller 22 and the underside of the ADF cartridge 62. In addition, the engagement between the actuators 64 of the pen door 56 and the ADF cartridge 62 also causes the precise tension or load to be placed on the pinch rollers 26.

Figure 4:
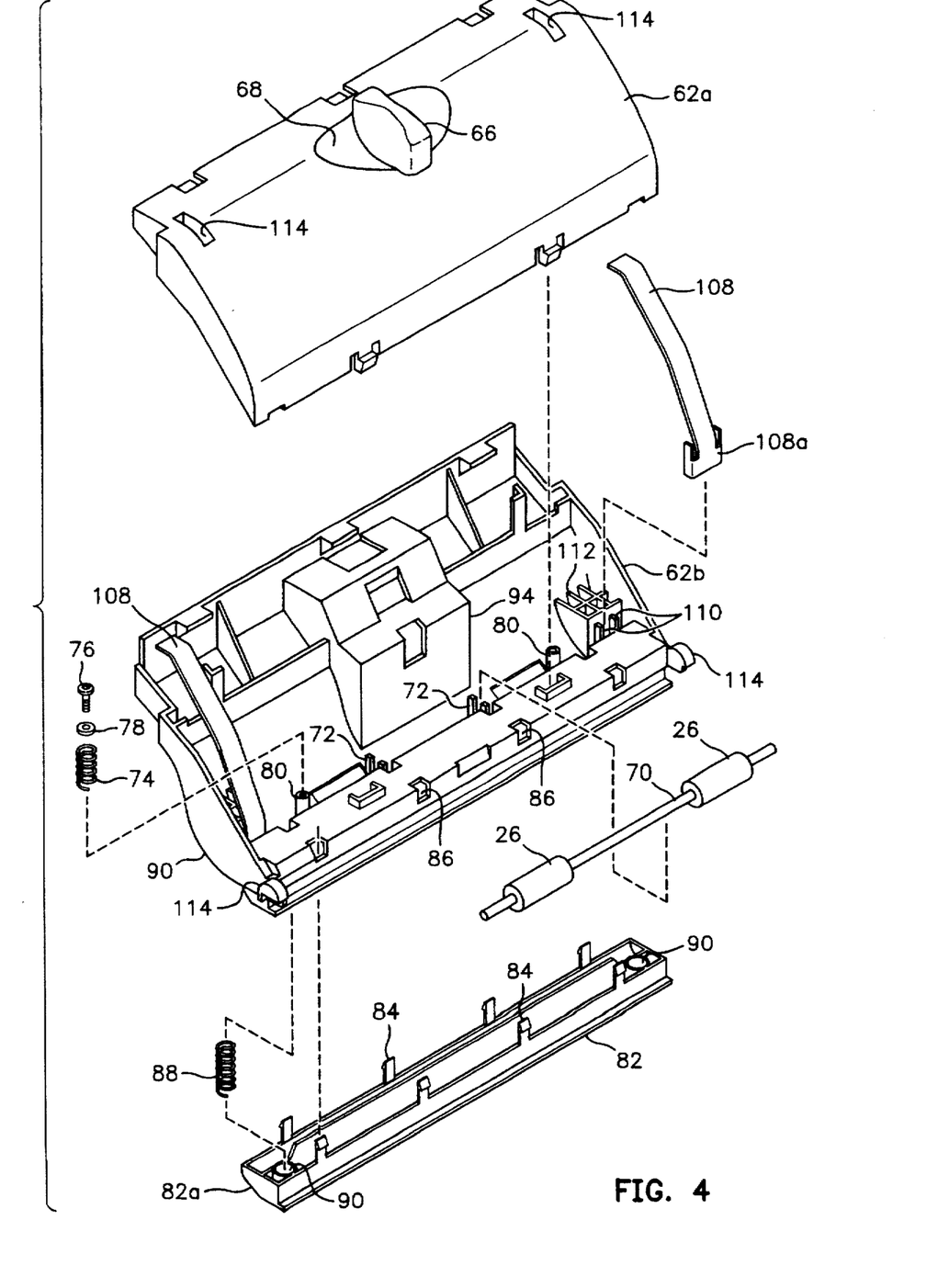
FIG. 4 is an enlarged, exploded, isometric view of the ADF cartridge.
Figure 5:
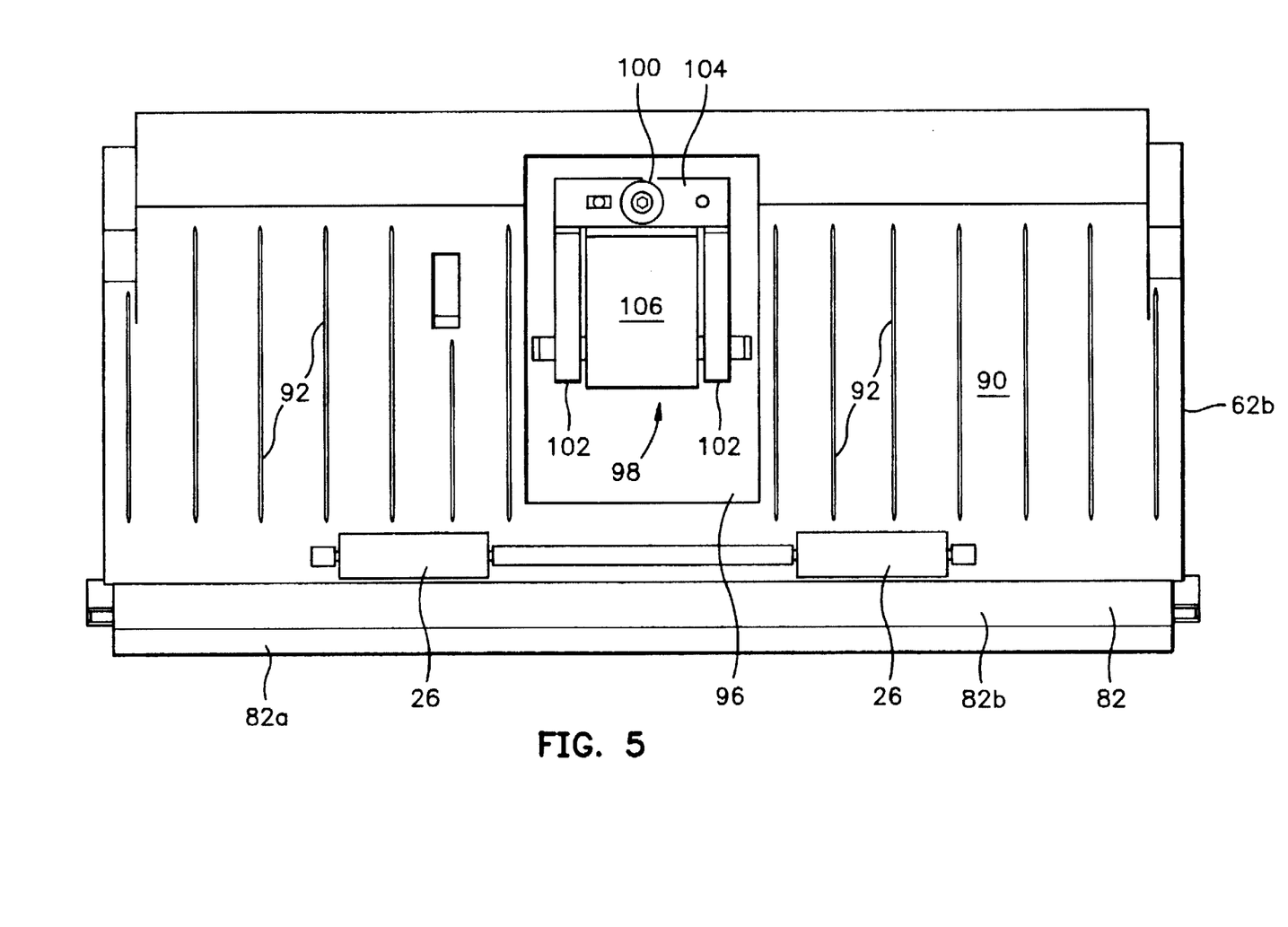
FIG. 5 is an enlarged bottom view of the ADF cartridge.
Figure 6:
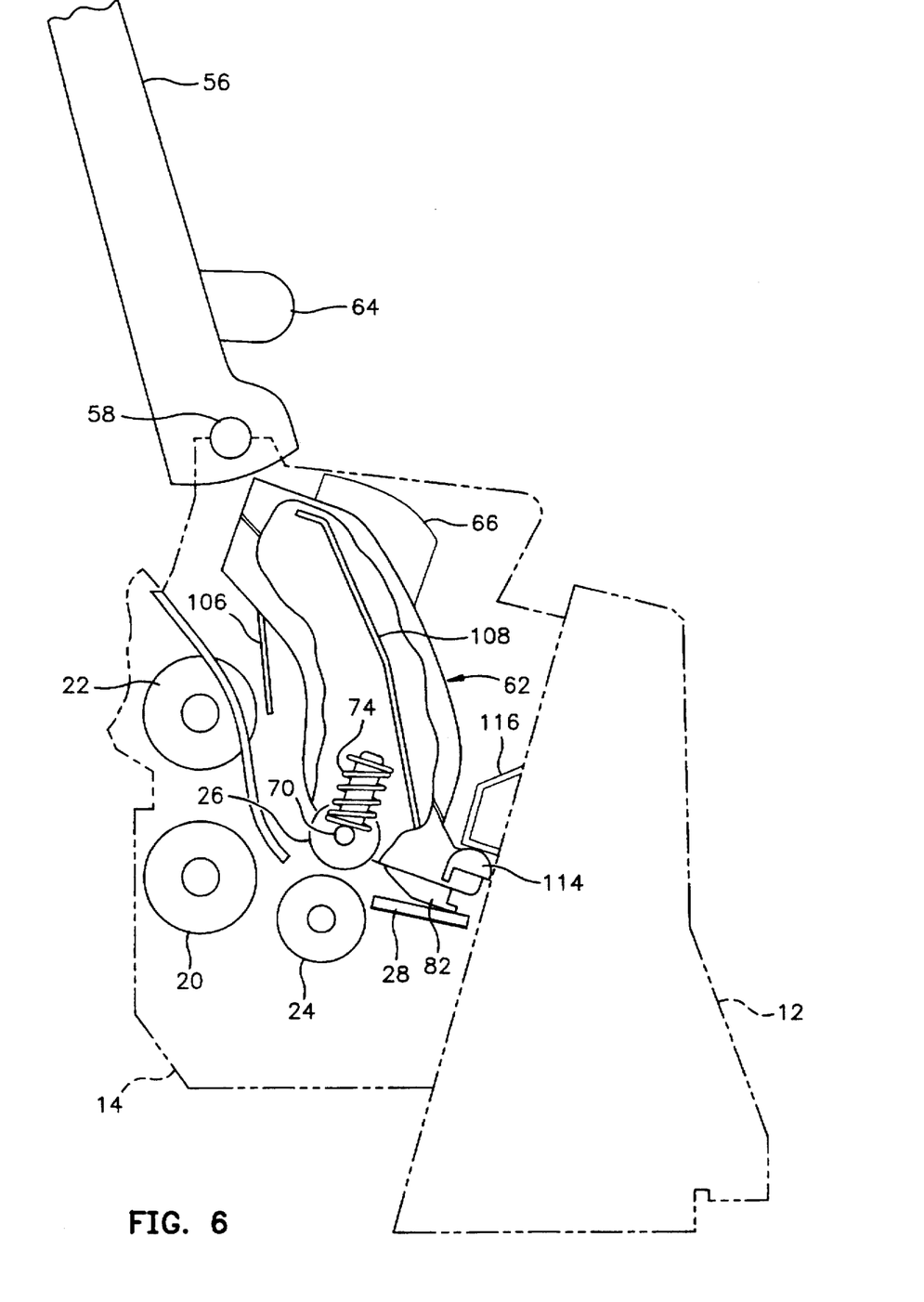
FIG. 6 is an enlarged, simplified side elevation view of the preferred embodiment illustrating the position of the ADF cartridge before being clamped in position by closure of the pen door.
Figure 7:
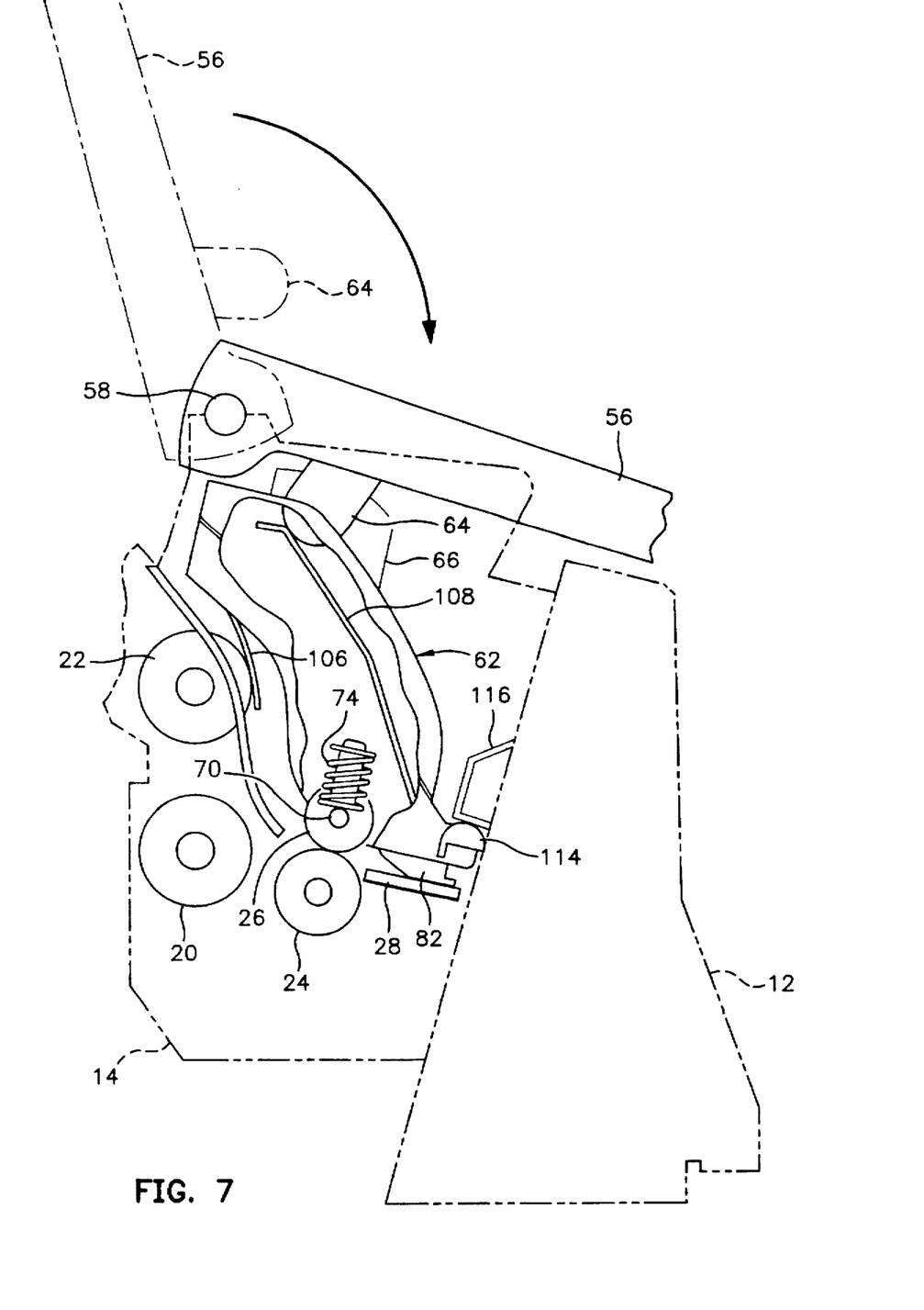
FIG. 7 is a view similar to FIG. 6 showing the ADF cartridge fully clamped in position by closure of the pen door.

Details of the construction of ADF cartridge 62 are illustrated in FIGS. 4 and 5. As seen therein, the ADF cartridge 62 includes a main hollow body formed of upper and lower sections 62a and 62b preferably made of injection molded plastic. A knob or handle 66 extends from a recess 68 on the upper section 62a of the ADF cartridge 62. A user may grasp the handle 66 between the thumb and index finger to lift the ADF cartridge 62 out of the media chassis 14. The pinch rollers 26 are journaled on a shaft 70. The shaft 70 is supported in devices 72 extending upwardly from the lower section 62b of the ADF cartridge 62. As shown in FIGS. 6 and 7 the opposite ends of the shaft 70 are located under the lower ends of coil springs 74 which are held in position by screws and washers 76 and 78 (FIG. 4). The screws 76 thread into vertical cylindrical sleeves 80 extending upwardly within the interior of the lower ADF cartridge section 62b. In this manner the pinch rollers 26 are biased toward the single paper path when the ADF cartridge 62 is normally positioned inside the media chassis 14.

A white plastic background element 82 (FIGS. 4 and 5) snaps into an underside of the lower ADF cartridge section 62b. The white background element 82 aligns with, and substantially covers, the scanner window 28 (FIG. 1) when the cartridge is normally positioned within the media chassis 14. The white background element 82 provides a suitable diffusely reflecting background for a document being conveyed over the scanner window 28 to optimize the illumination of the text and/or graphics thereon by the source 30 (FIG. 1) through the scanner window 28. As seen in FIGS. 4 and 5, the white background element 82 has an underside which is tapered at 82a to receive and direct the pages being conveyed along the single paper path segments S1 and S2.

The white background element 82 (FIG. 4) is mounted to reciprocate upwardly and downwardly relative to the lower ADF section 62b. A plurality of vertical legs 84 (FIG. 4) having hooks at their upper ends extend upwardly through corresponding aligned apertures 86 in the lower ADF cartridge section 62b. The hook portions of the legs 84 prevent the white background element 82 from falling out of the ADF cartridge 62 when the same is manually removed by a user. The white background element 82 is resiliently mounted to the lower ADF cartridge section 62b utilizing a pair of coil springs 88. The lower ends of the springs 88 seat within cylindrical receptacles 89 formed in the upper side of the white background element 82. The upper ends of the coil springs 88 seat in similar downwardly facing cylindrical receptacles (not visible) projecting from the underside of the lower ADF cartridge section 62b.

The underside 90 (FIG. 5) of the lower ADF cartridge section 62b has a convoluted or wave shape best seen in FIG. 4. The underside 90 defines the portions of the single common paper path adjacent the arrows D and S1 in FIG. 1. A plurality of longitudinally extending parallel ribs 92 (FIG. 5) project from the underside 90 of the lower ADF cartridge section 62b. The ribs 92 lessen the friction between the ADF cartridge 62 and a page being fed through the single common paper path.

A housing 94 (FIG. 4) formed in the lower ADF cartridge section 62b forms a downwardly opening receptacle 96 (FIG. 5). A document stripper assembly 98 is mounted in the receptacle 96 via bolt and washer assembly 100. The document stripper assembly 98 includes a pair of resilient leaf springs 102 whose inner ends are connected to a plate 104 secured by the bolt and washer assembly 100. The opposite ends of the leaf springs 102 are free to bend inwardly into the receptacle 96. The document stripper assembly 98 further includes a friction pad 106. The inner end of the friction pad 106 is rigidly secured to the plate 104 while the outer end of the friction pad 106 is free to depress inwardly into the receptacle 96. The document stripper assembly 98 cooperates with the ADF pick roller 22 (FIG. 1) in drawing a single document to be scanned from the ADF 18. The document picker assembly 98 is not illustrated in FIG. 1. The friction pad 106 of the document stripper assembly 98 is visible in FIGS. 6 and 7.

The ADF cartridge 62 is clamped in position in the media chassis 14 by closing the pen door 56 from its open position illustrated in FIG. 6 to its closed position illustrated in solid lines in FIG. 7. A pair of leaf springs 108 (FIGS. 4, 6 and 7) are mounted inside the hollow ADF cartridge 62 at opposite ends thereof. The lower ends of the leaf springs 108 are formed with mounting frames 108a (FIG. 4) which slip over parallel ribs 110 formed on mounting blocks 112 extending upwardly within the lower ADF cartridge section 62b. When the upper ADF cartridge section 62a is secured to the lower ADF cartridge section 62b the mounting frames 108a are locked into position because of the configuration of the inside surface of the upper ADF cartridge section 62a. The upper ends of the leaf springs 108 are free to bend upwardly and downwardly. The upper ADF cartridge section 62a is formed with apertures or slots 114 at opposite ends thereof through which the actuators 64 can penetrate (FIG. 7) to contact and engage the upper ends of the leaf springs 108.

When the ADF cartridge 62 is manually loaded inside of the media chassis 14, the ADF cartridge 62 is mated with a plurality of datum surfaces on the printer chassis 12. As best seen in FIG. 4, the lower ADF cartridge section 62b is formed at its opposite lower ends with a pair of hemispherical registration projections 114. When the ADF cartridge 62 is manually inserted into the media chassis 14, these registration projections 114 are slipped under corresponding shoulder projections 116 (FIG. 6) that extend from the printer chassis 12. The flat undersides of these projections 116 form the datum surfaces. When the ADF cartridge 62 is inserted into the initial load position illustrated in FIG. 6, the underside of the white background element 82 is aligned with, and overlies, the scanner window 28. Because the white background element 82 is resiliently mounted, it can deflect upwardly to allow a piece of paper to be propelled between the element 82 and the scanner window 28. Once the pen door 56 is swung to its fully closed position shown in FIG. 7, the actuators 64 penetrate the apertures 114 in the upper ADF cartridge section 62a. The lower ends of the actuators 64 engage the upper ends of the leaf springs 108. This forces the upper part of the ADF cartridge 62 downwardly slightly, bringing the friction pad 106 into contact with the ADF pick roller 22. This also brings the pinch rollers 26 into contact with the pinch rollers 24. Furthermore, the flat, non-tapered underside 82b (FIG. 5) of the white background element 82 is brought flat against the upper side of the scanner window 28. The closing of the pen door 56 thus clamps the ADF cartridge 62 into the final position illustrated in FIG. 7 at which time a tension or loading is placed on the pinch rollers 26.

During operation of the combined printer and scanner 10, if a user desires to clear a paper jam, he or she need merely lift up the pen door 56, manually lift out the ADF cartridge 62, and pull the jammed paper clear of the various pinch rollers inside the media chassis 14 and printer chassis 12. Alternatively, the user may also clean the scanner window 28 by removing the ADF cartridge 62. The single act of lifting the pen door 56 to its open position unclamps the ADF cartridge 62, and its pinch rollers 26 from the pinch rollers 24. The simple act of removing the ADF cartridge 62 allows access to jammed paper, and to the scanner window 28 for cleaning of the same. Once the jammed paper has been removed and/or the scanner window 28 has been cleaned, the user merely replaces the ADF cartridge 62 into its initially loaded position illustrated in FIG. 6, and then closes the pen door 56 to its closed position illustrated in FIG. 7. This pivots the ADF cartridge 62 slightly counter clockwise between FIG. 6 and FIG. 7, thus registering the ADF cartridge against the datum surfaces represented by the underside of the shoulder projections 116. The clamping achieved through the interaction of the actuators 64 with the resilient leaf springs 108 places the proper amount of load or tension on the pinch rollers 26 and also ensures proper registration of the hemispherical projections 114 against the datum surfaces on the undersides of the shoulder projections 116.

Having described a preferred embodiment of the combination printer and scanner of the present invention, and in particular a mechanism by which a pen door may be utilized to actuate pinch rollers in such a device, it should be apparent to those skilled in the art that my invention may be modified in both arrangement and detail. Therefore, the protection afforded my invention should only be limited in accordance with the scope of the following claims.

I claim:

1. A combination printer and scanner, comprising:

a frame;

roller means mounted in the frame for defining a single paper path therethrough;

automatic sheet feeder means mounted to the frame for selectively providing clean paper print sheets to the single paper path;

automatic document feeder means mounted to the frame for selectively providing documents having text and/or graphics printed thereon to be scanned to the single paper path;

a scanner station mounted in the frame at a first location along the paper path for scanning documents conveyed through the single paper path and generating signals representative of an image of the text and/or graphics scanned;

a printer station mounted in the frame at a second location along the paper path for printing text and/or graphics on print sheets conveyed through the single paper path;

pen door means hingedly connected to the frame for opening and closing a region along the single paper path to allow access to the scanner station to permit the cleaning of a scanner window thereof;

an automatic document feeder cartridge manually removable from the frame upon opening of the pen door means, the cartridge normally being positioned adjacent a scanner window of the scanner station to partially define a segment of the single paper path adjacent the scanner station and including a plurality of pinchrollers, the cartridge being clamped into position upon closing of the pen door means, and clamping means actuated by the opening and closing of the pen door means for releasing and applying tension on the pinch rollers to permit a print sheet or document jammed there between to be removed.

2. A combination printer and scanner according to claim 1 wherein the automatic document feeder cartridge has a curved underside that partially defines the segment of the single paper path adjacent the scanner station.

3. A combination printer and scanner according to claim 1 wherein the automatic document feeder cartridge includes a document stripper assembly mounted on an underside thereof.

4. A combination printer and scanner according to claim 1 wherein the clamping means includes at least one leaf spring mounted in the automatic document feeder cartridge having a first end engageable by the pen door means on closing to press the cartridge against a plurality of datum surfaces of the frame.

5. A combination printer and scanner according to claim 1 wherein the pinch rollers are journaled on a shaft and the automatic document feeder cartridge further includes spring means for biasing the shaft toward the single paper path when the cartridge is normally positioned in the frame.

6. A combination printer and scanner according to claim 1 wherein the automatic document feeder cartridge includes a white background element on an underside thereof that aligns with, and substantially covers, the scanner window when the cartridge is normally positioned in the frame.

7. A combination printer and scanner according to claim 6 wherein the cartridge includes means for resiliently mounting the white background element relative to a main body of the cartridge.

8. A combination printer and scanner according to claim 1 wherein the clamping means includes at least one projection that extends from the pen door means and engages the cartridge upon closing of the pen door means.

9. A combination printer and scanner according to claim 1 wherein the automatic document feeder cartridge includes a main hollow body inside which the pinch rollers are mounted.

10. A combination printer and scanner, comprising:

a frame;

roller means mounted in the frame for partially defining a single paper path therethrough;

means mounted to the frame for selectively providing clean paper print sheets to the single paper path;

means mounted to the frame for selectively providing documents having text and/or graphics printed thereon to be scanned to the single paper path;

a scanner station mounted in the frame at a first location along the paper path for scanning documents conveyed through the single paper path and generating signals representative of an image of the text and/or graphics scanned;

a printer station mounted in the frame at a second location along the paper path for printing text and/or graphics on print sheets conveyed through the single paper path;

pen door means hingedly connected to the frame for opening and closing a region along the single paper path to allow access to the scanner station to permit the cleaning of a scanner window thereof; and an automatic document feeder cartridge manually removable from the frame upon opening of the pen door means, the cartridge normally being positioned in the frame above the scanner window and including a main hollow body and a plurality of pinch rollers rotatably mounted inside the hollow body and protruding therefrom to partially define the segment of the paper path adjacent the scanner station, the cartridge being clamped into position upon closing of the pen door means.

11. A combination printer scanner unit having a frame with a plurality of datum surfaces, a printer, a scanner and a common sheet feeding path to facilitate the directing of a media sheet as it is moved across a scanner window to a print zone for scanning and printing purposes, comprising:

a pick roller mounted to the frame for helping to move the media sheet along an initial path of travel toward the common sheet feeding path;

an ADF cartridge including a document stripper assembly removably clamped within the frame and registered with the plurality of datum surfaces for cooperating with said pick roller to facilitate picking the media sheet so that it can be moved along said initial path of travel into the common sheet feeding path; and a reflective background element mounted resiliently to said ADF cartridge for overlying the scanner window so that light passing through the window is reflected for illuminating the media sheet as it travels along said common sheet feeding path between said element and the scanner window.

12. A combination printer scanner unit according to claim 11, wherein said ADF cartridge is configured to define said initial path of travel and the common sheet feeding path, said ADF cartridge has an outwardly projecting knob for helping a user to manually grasp the ADF cartridge to remove said ADF cartridge from the frame; and a friction pad is mounted on an underside of said document stripper assembly and depends downwardly therefrom for engaging said pick roller when said ADF cartridge is clamped in registered alignment with the plurality of datum surfaces;

whereby removal of said ADF cartridge from the frame provides a substantially unobstructed field of view to the scanner window to permit window cleaning and jammed media sheet removal from the common sheet feeding path and the initial path of travel.

13. In an input/output peripheral device having an automatic sheet feeder for moving an intput media sheet along a path of travel into a common sheet feeding path to facilitate the moving of the input media sheet across a scanning window of a document scanner and into a print zone of a printer, a media moving arrangement, comprising:

a base unit having a plurality of datum surfaces;

an input media pick roller mounted to said base unit for helping to pick and move an input media sheet along another path of travel into the common sheet feeding path;

a media pinch roller mounted in said base unit for cooperating with said pick roller for helping to move the input media sheet from said another path of travel along the common sheet feeding path across the scanning window; and a removable modular ADF cartridge clamped removably within said base unit and aligned with said plurality of datum surfaces for helping to define said another path of travel and the common sheet feeding path;

said removable modular ADF cartridge including:

a document stripper assembly having a downwardly depending friction pad mounted thereto for cooperating with said pick roller to facilitate picking the input media sheet so that it can be moved along said another path of travel into the common sheet feeding path;

a resiliently mounted reflective background element for overlying the scanner window so that light passing through the window is reflected for illuminating the input media sheet as it travels along said common sheet feeding path between said element and the scanner window; and a resiliently mounted pinch roller for cooperating with said media pinch roller to help move said input media sheet from said another path of travel along said common sheet feeding path across the scanner window.

14. A media movement arrangement according to claim 13, further comprising:

a latchable door pivotally mounted to said base unit having a pair of spaced apart actuators for engaging and pivoting said modular ADF cartridge into a clamped registered alignment position with said plurality of datum surfaces to facilitate input media sheet picking via said pick roller and said friction pad engaging one another in the another path of travel and to facilitate input media sheet movement from said another path and along said common sheet feeding path across the scanner window via said pinch roller and said another pinch roller engaging one another in the common path of travel.

15. A media movement arrangement according to claim 14, wherein said modular ADF cartridge further includes an outwardly projecting knob for helping a user to manually remove the modular ADF cartridge from said base unit to provide a substantially unobstructed field of view of the scanner window, the another path of travel and the common sheet feeding path to permit window cleaning and jammed media sheet removal.

* * * * *